(12) United States Patent
Fuchs et al.

(10) Patent No.: US 7,819,452 B2
(45) Date of Patent: Oct. 26, 2010

(54) AUTOMOTIVE STRUCTURAL JOINT AND METHOD OF MAKING SAME

(75) Inventors: John P. Fuchs, Farmington, MI (US);
John D. Fickes, Brighton, MI (US);
Erik Arthur Banks, Dearborn, MI (US);
Elisabeth Jane Berger, Farmington Hills, MI (US)

(73) Assignees: United States Council for Automotive Research, Southfield, MI (US); United States Automotive Materials Partnership, LLC, Southfield, MI (US)

( * ) Notice: Subject to any disclaimer, the term of this patent is extended or adjusted under 35 U.S.C. 154(b) by 261 days.

(21) Appl. No.: 12/119,084

(22) Filed: May 12, 2008

(65) Prior Publication Data

US 2009/0278371 A1 Nov. 12, 2009

(51) Int. Cl.
B62D 27/00 (2006.01)
B32B 37/12 (2006.01)
(52) U.S. Cl. .......................... 296/29; 156/60
(58) Field of Classification Search ............... 296/29, 296/30; 156/60
See application file for complete search history.

(56) References Cited

U.S. PATENT DOCUMENTS

| 3,256,669 | A | 6/1966 | Seiwert |
| 4,791,765 | A | 12/1988 | Noggle |
| 6,037,559 | A | 3/2000 | Okabe et al. |
| 6,291,792 | B1 | 9/2001 | Fussnegger et al. |
| 6,428,905 | B1 | 8/2002 | Behr et al. |

OTHER PUBLICATIONS

The Weld Bond Procedure: A perfect union; Combining adhesives and welding requires getting two different procedures right. (Metal Shop), Dated Jun. 1, 2005, Printed from Highbeam Encyclopedia, www. encyclopedia.com/1G1-135373186.html.

Oberle, et al., Optimizing resistance spot welding paramaters for vibration damping steel sheets, Jan. 1, 1998, Welding Journal; vol. 77, Issue: 1; PBD; Jan. 1998.

*Primary Examiner*—Lori L Lyjak
(74) *Attorney, Agent, or Firm*—Brooks Kushman P.C.

(57) ABSTRACT

A joint for an automotive vehicle may be formed by applying an adhesive to at least one of a first member and a first surface of a composite member, placing the first member in contact with the first surface of the composite member, applying an adhesive to at least one of a second member and a second surface of the composite member, positioning a divot portion of the second member within an aperture of the composite member, placing the second member in contact with the second surface of the composite member, attaching the divot portion of the second member with the first member and curing the adhesives.

12 Claims, 2 Drawing Sheets

AUTOMOTIVE STRUCTURAL JOINT AND METHOD OF MAKING SAME

BACKGROUND

1. Field

The invention relates to automotive structural joints and methods of making the same.

2. Discussion

Certain structural panels and joints are known. As an example, U.S. Pat. No. 3,256,669 to Seiwert discloses a reinforced metal panel assembly made by using a pair of metal panels and an intermediate core of suitable material such as plywood, balsa, Masonite, wall-board, aluminum or any of the other light metals. The panels are joined to produce a compressive interference fit between the panels and the core. The metal panels may be designated as an inner and an outer panel depending on their intended position in a finished structure.

As another example, U.S. Pat. No. 4,791,765 to Noggle discloses a synthetic material structural body panel comprising a synthetic material. An aperture extends through the synthetic material panel. A metal attachment plate fixedly engages the synthetic material and spans the aperture. Noggle also discloses a joint between the synthetic material structural body panel and another structural body panel. The joint comprises a metal attachment plate as described above and means, such as spot welding, for securing the metal attachment plate to the other structural body panel.

As yet another example, U.S. Pat. No. 6,291,792 to Fussnegger et al. discloses a welded joint made between a sheet-steel component and a sheet-aluminum component by way of a lap or web weld. Hat-like clip parts are pushed through openings in the sheet-aluminum component. The clip parts are welded at their bottom to the sheet-steel component and overlap an exposed flat side of the sheet-aluminum component with their flanges. An adhesive is introduced into a gap situated between the clip part and the sheet-aluminum component.

SUMMARY

A joint for an automotive vehicle may comprise a composite member having opposing surfaces and including an aperture extending therethrough and a first metal member positioned adjacent to one of the opposing surfaces of the composite member. The joint may also include a second metal member positioned adjacent to the other of the opposing surfaces of the composite member. The second metal member includes a portion extending into the aperture of the composite member. The portion extending into the aperture is fixedly attached with the first metal member. The joint may further include a first uncured adhesive layer disposed between one of (i) the first metal member and the one of the opposing surfaces of the composite member and (ii) the second metal member and the other of the opposing surfaces of the composite member.

A structural member for an automotive vehicle may include a composite panel having opposing sides and a surface defining an aperture therethrough. The structural member may also include first and second metal panels respectively adhesively bonded to the opposing sides of the composite panel. The first and second metal panels each include a button formed thereon. The buttons each extend into the aperture and are attached together.

A structural joint for an automotive vehicle may comprise a composite member having opposing surfaces and including an aperture extending therethrough, a first member adhered with one of the opposing surfaces of the composite member and a second member adhered with the other of the opposing surfaces. The second member includes a portion extending into the aperture of the composite member. The portion extending into the aperture is fixedly attached with the first member.

A method of forming a structural joint for an automotive vehicle may include applying an adhesive to at least one of a first member and a first surface of a composite member, placing the first member in contact with the first surface of the composite member and applying an adhesive to at least one of a second member and a second surface of the composite member opposite the first surface. The method may also include positioning a divot portion of the second member within an aperture of the composite member, placing the second member in contact with the second surface of the composite member, attaching the divot portion of the second member with the first member and curing the adhesives.

While example embodiments in accordance with the invention are illustrated and disclosed, such disclosure should not be construed to limit the claims. It is anticipated that various modifications and alternative designs may be made without departing from the scope of the invention.

DETAILED DESCRIPTION

Figure 1:
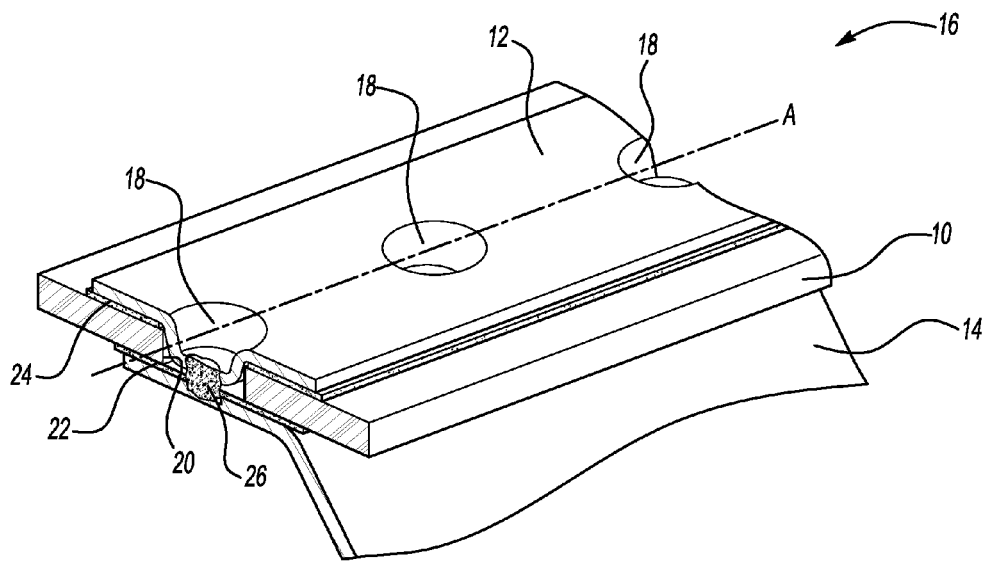
FIG. 1 is a perspective view of an embodiment of a portion of an automotive structural joint.

Referring now to FIG. 1, a composite member 10 is sandwiched between members 12, 14 to form a structural joint 16. The composite member 10 may comprise any synthetic material suitable for use as a structural member for an automotive vehicle. For example, the composite member 10 may comprise a non-reinforced or fiber-reinforced thermoplastic and/or a thermoset plastic. The material comprising the composite member 10 may be selected based on the particular application for which it is intended. Suitable commercially available fibers include glass fibers, carbon fibers, etc. and any combination thereof. Of course, other suitable materials may be used.

The members 12, 14 may comprise any suitable metal, e.g., steel, aluminum, etc., for use in automotive applications. For example, the member 12 may comprise a steel doubling plate and the member 14 may comprise a structural steel rail configured to act as a load bearing member of a vehicle body.

The composite member 10 of a chosen synthetic material may be formed or shaped into the desired configuration using any suitable technique. Such suitable techniques include injection molding, resin transfer molding and compression molding. The technique used may depend on the material employed. For example, compression molding techniques may be applied to sheet molding compounds (SMC) including a fiber-reinforced thermoset polyester.

In the embodiment of FIG. 1, buttons 18, e.g., divots, depressions, etc., are provided in the member 12 and extend into respective apertures 20 in the composite member 10. The buttons 18 may be stamped or otherwise integrally formed with the member 12. In other embodiments, the buttons 18 may be provided in the member 14 in addition to, or instead of, the member 12. In certain of these embodiments, some of the buttons 18 provided in the members 12, 14 may extend into the same apertures 20 (and, for example, meet in a middle of the apertures 20) while other of the buttons 18 may extend into different apertures 20. For example, the buttons 18 provided in the members 12, 14 may extend into every other of the apertures 20 in an alternating fashion. Of course, other configurations are also possible.

The buttons 18 of FIG. 1 are sized relative to the apertures 20 so as to provide a clearance fit. In other embodiments, the buttons 18 may be sized relative to the apertures 20 so as to provide an interference fit.

The structural joint 16 illustrated in FIG. 1 includes three buttons positioned generally along an axis, A. Of course, a greater or fewer number of the buttons 18 may be used. In other embodiments, the buttons 18 may be positioned to form a grid or other desired pattern/layout.

In some embodiments, a portion of each of the buttons 18 contact and are welded, as discussed below, to the member 14. In other embodiments, the buttons 18 may be riveted, bolted or otherwise mechanically fastened to the member 14. Additionally, the buttons 18 (and the apertures 20) may be of sufficient size so as to permit several welds per button 18.

The buttons 18 may be formed so that portions of the member 12 lie flush against the composite member 10. For example, the buttons 18 may have a depth approximately equal to the thickness of the composite member 10. The buttons 18 may also be formed so that portions of the member 12 are spaced away from the composite member 10. For example, the buttons 18 may have a depth that is greater than the thickness of the composite member 10. Other configurations and arrangements are also possible.

The apertures 20 may be formed during the initial manufacture of the composite member 10. For example, the apertures 20 may be cut into the composite member 10 or may be provided by appropriate design of the tooling used in molding the composite member 10.

The apertures 20 of FIG. 1 have a shape complimentary to the buttons 18. In other embodiments, the apertures 20 may, for example, have a shape non-complimentary to the buttons 18. For example, the apertures 20 may have a square shape and the buttons 18 may have a conical shape.

As discussed below, the members 12, 14 are bonded with the composite member 10 so as to span, e.g., cover, the apertures 20 of the composite member 10. The buttons 18 of FIG. 1 engage the apertures 20 to, inter alia, locate the member 12 relative to the composite member 10. When the members 12, 14 are attached with the composite member 10, at least a portion of the composite member 10 surrounding the apertures 20 is sandwiched between the members 12, 14. The members 12, 14 may be adhesively bonded, as discussed below, or otherwise fixedly engaged with the composite member 10 so as to cover the apertures 20.

Adhesives for bonding the members 12, 14 with the composite member 10 may include an epoxy, urethane, acrylic, etc., applied, for example, as a tape, liquid, paste or pressure sensitive adhesive. Any suitable adhesive, however, may be used. The selection of a suitable adhesive may depend on the material comprising the composite member 10, the cost of the adhesive, ease of processing the adhesive, the intended use of the structural joint 16, etc. The adhesives may be cured by heat, room-temperature chemical reaction, induction or any other curing method.

In some embodiments, gaps between the members 10, 12 and 10, 14 may be determined by glass beads, wires, stand-offs on any of the members 10, 12, 14, assembly fixturing, etc.

As apparent to those of ordinary skill, the composite member 10 and the members 12, 14 may have any configuration suitable for the environment and/or intended use of the structural joint 16. For example, in embodiments where the member 14 is curved, the composite member 10 and member 12 may also be formed with corresponding curves to mate with the member 14. Likewise, the apertures 20 and buttons 18 may have any suitable configuration for the environment and/or intended use of the structural joint 16. For example, the apertures 20 may have a triangular, square or other suitable shape. Similarly, the buttons 18 may have a mating triangular, square or other suitable shape similar or dissimilar to the shape of the apertures 20.

Figure 2A:
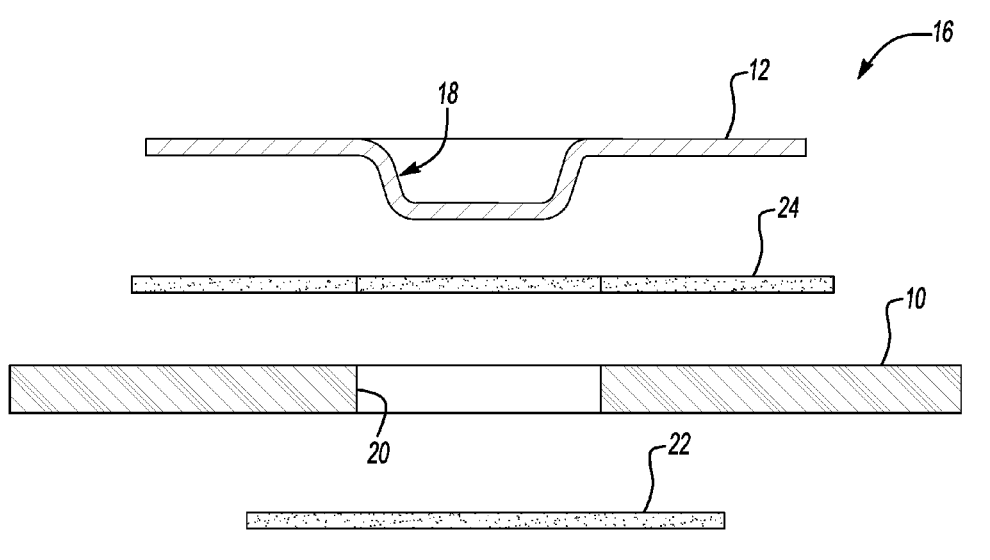
FIG. 2A is an exploded view, in cross-section, of the automotive structural joint of FIG. 1.
Figure 2A:
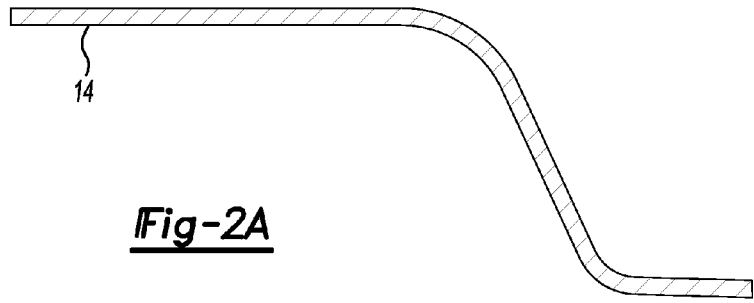
Figure 2B:
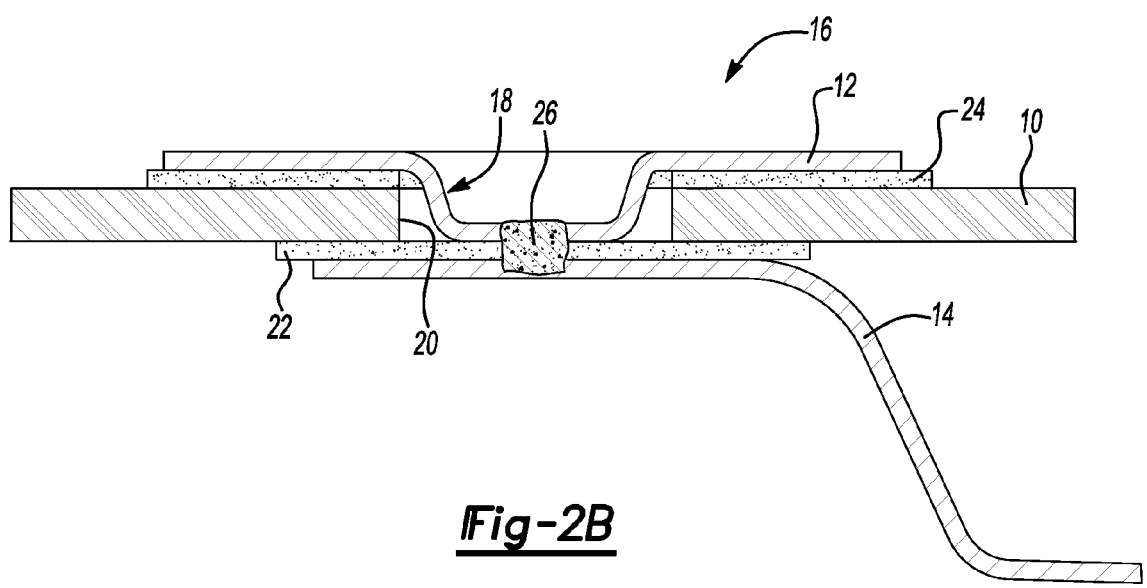
FIG. 2B is an assembly view, in cross-section, of the automotive structural joint of FIG. 1.

Referring now to FIGS. 2A and 2B, the following may be performed to assemble the structural joint 16. An adhesive layer 22 is applied to one or both of the composite member 10 and the member 14. The member 14 is then placed in contact with the composite member 10. An adhesive layer 24 is applied to one or both of the composite member 10 and the member 12. The member 12 is positioned relative to the composite member 10 such that the button 18 is in registration with the aperture 20. The member 12 is then placed in contact with the composite member 10. The button 18 is fixedly attached, e.g., spot welded, with the member 14 at weld 26. The adhesive layers 22, 24 are then cured to bond the composite member 10 with the members 12, 14. Because the button 18 is fixedly attached with the member 14 prior to curing, there is no need for fixturing or other machinery to hold the members 12, 14 in place relative to one another during the curing process.

In other embodiments, the adhesive layer 24 may first be applied to one or both of the composite member 10 and the member 12. The member 12 may then be positioned relative to the composite member 10 such that the button 18 is in registration with the aperture 20. The member 12 may then be placed in contact with the composite member 10. The adhesive layer 22 may next be applied to one or both of the composite member 10 and the member 14. The member 14 may then be placed in contact with the composite member 10. Welding, for example, of the button 18 with the structural member 14 and curing of the adhesive layers 22, 24 may follow. In still other embodiments, the adhesive layers 22, 24 may be applied at the same time, etc., prior to fixedly attaching and curing. Alternatively, a single adhesive layer may also be applied prior to fixedly attaching and curing.

The structural joint 16 may be used in a variety of applications. For example, the structural joint 16 may be used to join a composite floorpan of an automotive vehicle to a steel frame rail, dash-panel and rear floor of the vehicle. The structural joint 16 may also be used to join a composite hood inner panel of an automotive vehicle to steel hinge reinforcements of the vehicle, etc.

While only certain embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A joint for an automotive vehicle comprising:
   a composite member having opposing surfaces and including an aperture extending therethrough;
   a first metal member positioned adjacent to one of the opposing surfaces of the composite member;
   a second metal member positioned adjacent to the other of the opposing surfaces of the composite member, the second metal member including a portion extending into the aperture of the composite member, the portion extending into the aperture being fixedly attached with the first metal member; and a first uncured adhesive layer disposed between one of (i) the first metal member and the one of the opposing surfaces of the composite member and (ii) the second metal member and the other of the opposing surfaces of the composite member.

2. The joint of claim 1 further comprising a second uncured adhesive layer disposed between the other of (i) the first metal member and the one of the opposing surfaces of the composite member and (ii) the second metal member and the other of the opposing surfaces of the composite member.

3. The joint of claim 1 wherein the portion extending into the aperture at least partially defines a divot in the second member.

4. The joint of claim 3 wherein the divot has a conical shape.

5. The joint of claim 3 wherein the divot has a square shape.

6. The joint of claim 1 wherein the second member comprises sheet metal.

7. The joint of claim 1 wherein the composite member comprises a glass reinforced thermoset.

8. The joint of claim 1 wherein the aperture is round.

9. The joint of claim 1 wherein the portion extending into the aperture is welded with the first metal member.

10. A structural joint for an automotive vehicle comprising:
a composite member having opposing surfaces and including an aperture extending therethrough;
a first member adhered with one of the opposing surfaces of the composite member; and
a second member adhered with the other of the opposing surfaces, the second member including a portion extending into the aperture of the composite member, the portion extending into the aperture being fixedly attached with the first member.

11. The joint of claim 10 wherein at least a portion of the composite member is sandwiched between the first and second members.

12. The joint of claim 10 wherein the portion extending into the aperture is welded with the first member.

* * * * *

UNITED STATES PATENT AND TRADEMARK OFFICE
CERTIFICATE OF CORRECTION

| | | |
|---|---|---|
| PATENT NO. | : 7,819,452 B2 | Page 1 of 1 |
| APPLICATION NO. | : 12/119084 | |
| DATED | : October 26, 2010 | |
| INVENTOR(S) | : John P. Fuchs | |

It is certified that error appears in the above-identified patent and that said Letters Patent is hereby corrected as shown below:

*Please add the following after the title:*

STATEMENT REGARDING FEDERALLY SPONSORED RESEARCH OR DEVELOPMENT

The invention was made with Government support under Cooperative Agreement Nos. DE-FC26-02OR22910 and DE-EE0003583. The Government has certain rights to the invention.

Signed and Sealed this
Second Day of August, 2011

David J. Kappos
*Director of the United States Patent and Trademark Office*